3,206,281
PROCESS FOR PREPARING PULVERULENT HYDRATES OF ZINC NITRATE
August Moeller, Frankfurt am Main, Germany, assignor to Farbwerke Hoechst Aktiengesellschaft vormals Meister Lucius & Brüning, Frankfurt am Main, Germany, a corporation of Germany
No Drawing. Filed Sept. 21, 1962, Ser. No. 225,389
Claims priority, application Germany, Sept. 25, 1961, F 35,000
6 Claims. (Cl. 23—102)

The present invention relates to a process for preparing pulverulent hydrates of zinc nitrate, in particular pulverulent hydrates of zinc nitrate containing 1 to 4 mols of water of hydration per mol of zinc nitrate.

Zinc nitrate, which is employed in the industry for various purposes, is a readily soluble compound which in water forms various salt hydrates. The following table comprises the names of these hydrates, their molecular weight, their content of water and their melting points (as ar as they are known).

| Zinc nitrate | Molecular weight | Percent of water | Melting point, °C. |
|---|---|---|---|
| $Zn(NO_3)_2$ | 189.396 | | |
| $Zn(NO_3)_2 \cdot 1H_2O$ | 207.41 | 8.68 | 73.0 |
| $Zn(NO_3)_2 \cdot 2H_2O$ | 225.43 | 15.98 | 55.4 |
| $Zn(NO_3)_2 \cdot 3H_2O$ | 243.44 | 22.20 | |
| $Zn(NO_3)_2 \cdot 4H_2O$ | 261.46 | 27.56 | 44.7 |
| $Zn(NO_3)_2 \cdot 6H_2O$ | 297.49 | 36.34 | 36.1 |

The existence of zinc nitrate-3-hydrate as a definite compound has recently been called in question. The usual commercial zinc nitrate corresponds to a 5-6-hydrate.

As can be seen from the table given above the compounds having a higher content of hydrates have comparatively low melting points. When zinc nitrate-6-hydrate is admixed with other salts containing water of hydration and in certain cases even when zinc nitrate-4-hydrate is admixed with other salts containing water of hydration, the melting point of the mixture may come near room temperature or possibly be lower than room temperature, so that a product is obtained which sticks together and melts whereas it is desired to obtain a pulverulent product suitable for use. Mixtures of the aforesaid kind, for example, a mixture comprising the zinc nitrate hydrate and an acid salt, may decompose with the formation of nitric oxides which are very undesired when the mixtures are stored and used. Mixtures comprising a hydrate of a zinc nitrate and, as an acid salt, a primary sodium phosphate are used, for example, for phosphatizing iron and steel in order to protect them against corrosion. Attempts have been made to prevent the occurrence of these melting phenomena by means of additives or coatings, for example by means of zinc oxide or a neutral oil.

The use of zinc nitrate for industrial purposes would in particular be considerably facilitated if it should be possible to prepare zinc nitrate having a lower content of water on an industrial scale.

It is known to prepare zinc nitrate-6-hydrate by dissolving zinc metal in nitric acid and concentrating the solution until crystallization takes place. When attempts are made to further concentrate the 6-hydrate thus obtained, for example, until it contains 4 or less than 4 mols of water of hydration, difficulties are encountered which are due to the fact that decomposition phenomena occur very easily and that even the solid final product obtained which contains, for example, 3 mols of water of hydration per mol of zinc nitrate, gives off nitric oxides when standing or stored. Difficulties are likewise encountered when such products are disintegrated by grinding since decomposition is favoured by a local superheating. The direct preparation of zinc nitrate-2-hydrate has also been described in literature ("Gmelins Handbuch der anorganischen Chemie," 8th edition, system No. 32, main volume 1924, page 151). However, this passage refers to the direct preparation of zinc nitrate-2-hydrate in a general way only, saying that zinc nitrate-2-hydrate can be precipitated from a hot zinc nitrate-2-hydrate-containing solution of concentrated nitric acid by cooling. Such a process is, however, complicated and not suitable for a preparation of the product on an industrial scale.

Since in the dehydration of the 6-hydrate in vacuo at a temperature below 100° C. the water of hydration escapes only slowly from the molten mass an industrial process based on this operation would likewise be uneconomical.

It is known that on a laboratorial scale zinc nitrate-6-hydrate is dehydrated in a dessiccator with the use of hygroscopic substances, for example, concentrated sulphuric acid or phosphorus pentoxide, until it contains, for example, 2 mols of water. That process is, however, also not suitable for preparing a zinc nitrate containing little water on an industrial scale.

Now I have found a process for the preparation of pulverulent hydrates of zinc nitrate, preferably pulverulent hydrates of zinc nitrates containing 1 to 4 mols of water of hydration per mol of zinc nitrate, which does not have the above-mentioned disadvantages of the known processes and which enables products of the said kind to be prepared in a simple manner on an industrial scale. According to the process of the invention pulverulent zinc oxide, to which may be added the quantity of water still required for the desired hydrate, is reacted in a mixing or masticating machine of refined steel with the stoichimetrical quantity of concentrated nitric acid. The reaction mixture is maintained at a temperature which is a little below the melting point of the hydrate to be prepared, so that the reaction mixture is prevented from melting completely and retains a consistency facilitating the reaction with the nitric acid owing to the shearing and friction effects exerted during the masticating or mixing operation on the surface of the zinc oxide which has not yet undergone conversion. Finally the reaction mass is cooled to a temperature below the melting point of the hydrate to be prepared while the mixing or masticating machine remains running. A critical temperature range cannot be indicated for this case. In general it is, however, suitable to cool the mass to a temperature within the range of about 15° to 30° C., the temperature depending in particular on the cooling agent used, which may be, for example, water or brine. Owing to the fact that the blades of the mixing or masticating machine continue running, the heat exchange with the cooling agent used is improved and the hydrate of zinc nitrate formed is directly obtained in pulverulent form.

It is particularly advantageous to melt the reaction mixture after the reaction between nitric acid and zinc oxide has been entirely or largely completed and then to cool the mixture to room temperature, that is to say to a temperature within the range of, for example, 15° to 30° C., while the mixing or masticating machine remains running.

According to the invention it is suitable to carry out the reaction proper between the zinc oxide and the nitric acid used while maintaining the reaction mixture at a temperature which is at most 20° C., preferably 4° to 10° C., below the melting point of the hydrate to be prepared.

The aforesaid temperature can be maintained by cooling the mixing or masticating device or by regulating the speed at which the nitric acid is supplied.

Suitable mixing or masticating devices which may be used in the process according to the invention are, for example, the known masticators of the type Werner-Pfleiderer or Beken which for the purpose of being cooled are provided with double jackets or with cooling chambers welded to them. As cooling agents may be used the agents generally used for this purpose, in particular water or cooling brines. Since in general it is sufficient to cool to a temperature within the range of 15° to 30° C. the masticators are, in particular, cooled with water. The mixing or masticating device used in the process of the invention is suitably made of refined steel in order to be sufficiently resistant against the corrosion caused by the nitric acid used.

The concentration of the nitric acid used depends in particular on the desired content of water of hydration of the product to be prepared, on the content of water of the zinc oxide used and, if water is added before the reaction, also on the quantity of this water. For in contradistinction to the known processes, in the process according to the present invention, the total quantity of water added to the reaction mixture must not be larger than the quantity of water required for the formation of crystal water in the hydrate desired. In most cases the minimum concentration is about 70% by weight. The upper limit of the concentration of $HNO_3$ is in general at about 98% by weight, which corresponds to the concentrated fuming nitric acid prepared in practice.

According to the invention the temperature at which the reaction mixture is melted after the reaction is terminated is suitably not above about 80° C.

If it is desired to obtain a hydrate of zinc nitrate containing a free portion of zinc oxide the required excess quantity of zinc oxide can be placed into the mixing or masticating apparatus together with the required quantity of zinc oxide used as starting material.

When the hydrates of zinc nitrate prepared by the process according to the invention are stocked or stored they do not decompose and in the form of zinc nitrate-2-hydrate they can easily be processed with other chemical substances are required, for example, for phosphatizing iron and steel, into stable, storable mixtures.

The following examples serve to illustrate the invention but they are not intended to limit it thereto.

*Example 1*

500 grams of well dried zinc oxide were placed in a masticator of refined steel having a capacity of 2 liters, which could be heated and cooled and which was closed with the exception of an inlet for nitric acid and a tube for adjusting the pressure. In the course of about 2 hours 800 grams of concentrated fuming nitric acid of 98% strength were added while the masticator was simultaneously cooled with water, so that during the reaction the temperature did not exceed 50° C. When the addition of nitric acid was terminated mixing was continued for about half an hour while the masticator was heated to a temperature within the range of about 70° to 75° C. Then the reaction mixture was cooled to 30° C. in the course of another half hour while the masticator remained running. 1250 grams of pulverulent zinc nitrate were obtained which contained 9.8% of water. This corresponded to a content of 1.14 mols of water per mol of zinc nitrate. The zinc nitrate obtained did not undergo a modification or decomposition even when stored for a long time.

*Example 2*

150 kilograms of commercial zinc oxide containing about 2.4% of moisture were placed in a mixing apparatus of refined steel which could be heated and cooled, which had a total capacity of 400 liters and which could be closed with the exception of a tube for adjusting the pressure and an inlet for nitric acid. In the course of 2 to 3 hours, during which the temperature was maintained within the range of 40° to 50° C by cooling the mixing apparatus, 259 kilograms of concentrated nitric acid were introduced, which had been adjusted to a density of 1.480 at 20° C., which corresponds to a content of 88.7% of $HNO_3$.

After the nitric acid had been introduced the mixing apparatus was gently heated to about 60° to 65° C., that is to say to a temperature a little above the melting point, whereby the whole of the mass was caused to melt. Then the mass was allowed to after-react for a period of up to half an hour. The mixture was then cooled to 25° C. while the blades of the masticator were still running. This took 1 to 2 hours depending on whether water or brine was used for the cooling.

400 kilograms of zinc nitrate were obtained in the form of a pulverulent material containing 16% of water and thus corresponding to zinc nitrate-2-hydrate. When the zinc nitrate thus obtained was stored and mixed it was stable and did not give off nitric oxides.

*Example 3*

A batch was prepared and processed in the manner described in Example 2, the only difference being that instead of 150 kilograms of zinc oxide 165 kilograms of zinc oxide were placed in the mixing apparatus. 412 kilograms of a zinc nitrate-2-hydrate containing about 4% of free zinc oxide were obtained as the final product.

*Example 4*

10 kilograms of dry zinc oxide were placed in a masticator of refined steel which could be heated and cooled and had a total capacity of 40 liters. 4.1 liters of water were added and the apparatus was closed with the exception of the inlet for the nitric acid and the tube for adjusting the pressure. In the course of 1 to 2 hours during which the mass was cooled to a temperature within the range of 25° to 35° C., a total quantity of 16.0 kilograms of concentrated fuming nitric acid of 98% strength was added. Mixing was continued for about half an hour while the mass was heated to about 55° C. and the reaction product was then cooled to 20° C. while the masticator remained running. 29.2 kilograms of zinc nitrate containing 22% of water, which corresponded to a proportion of 1 mol of zinc nitrate to 3 mols of water, were obtained.

*Example 5*

10 kilograms of zinc oxide containing 2.44% of moisture were placed in a masticator of refined steel, which could be heated and cooled, had a total capacity of 40 liters and could be closed with the exception of an inlet for nitric acid and a tube serving to adjust the pressure. 0.5 liter of water was added.

Subsequently 21 kilograms of nitric acid of 43.5° Bé. and a specific gravity of 1.42 at 15° C., which corresponded to a content of 72.6% of $HNO_3$, were introduced in the course of about 1 hour while the reaction mass was kept by cooling at a temperature within the range of 25° to 40° C. Mixing was continued for another 20 to 30 minutes while heating to about 50° C., that is to say to a temperature a little above the melting point. Then the mass was cooled to 15° C. 30.2 kilograms of zinc nitrate containing 27.6% of water, which corresponded to a content of 4 mols of water per mol of zinc nitrate, were obtained in pulverulent form.

I claim:

1. A process for the production of pulverized hydrates of zinc nitrate containing 1 to 4 mols of water of hydration per 1 mol of zinc nitrate which comprises reacting pulverized zinc oxide with a stoichiometric amount of nitric acid of a strength of about 70% by weight to about 98% by weight by intimately mixing and kneading in a suitable device of refined steel, maintaining in the reaction mixture a temperature in the range of at least about 2° C. and at most 20° C. below the melting point of the hydrate to be produced, and cooling the reaction mass obtained to a temperature in the range between about 15° C. and about 30° C. while continuing mixing and kneading in said device.

2. A process as claimed in claim 1, wherein the reaction mass obtained by the reaction of zinc oxide with nitric acid is melted by being further heated to a temperature not exceeding 80° C. before it is cooled to said range of temperature between about 15° C. and about 30° C.

3. A process as claimed in claim 1, wherein water is additionally added to the mixture of zinc oxide and nitric acid in an amount corresponding to the water of hydration content of the hydrate to be produced, the water content of the zinc oxide and the nitric acid used being removed.

4. A process as claimed in claim 1, wherein a temperature in the range between about 4° C. and about 10° C. below the melting point of the hydrate to be produced is maintained in said reaction mixture.

5. A process as claimed in claim 1, wherein said range of temperature to be maintained in the reaction mixture is regulated by cooling said device and by adjusting the rate at which the nitric acid is added to the zinc oxide.

6. A process as claimed in claim 1, wherein an excess of zinc oxide over its stoichiometrical amount as compared with the amount of nitric acid is used in order to obtain a hydrate product containing free excess zinc oxide.

References Cited by the Examiner
UNITED STATES PATENTS 2,017,980   10/35   McQuaid _____ 23—102

FOREIGN PATENTS 264,480   5/27   Great Britain.

OTHER REFERENCES

Mellor: "Comprehensive Treatise on Inorganic and Theoretical Chemistry," vol. 4 (1923), pages 650 and 651.

MAURICE A. BRINDISI, *Primary Examiner.*